Feb. 16, 1954 E. P. HARRIS ET AL 2,668,987
MOLD FOR AND METHOD OF MOLDING FOAM
RUBBER STRIPS AND THE LIKE
Filed Oct. 21, 1950 2 Sheets-Sheet 1
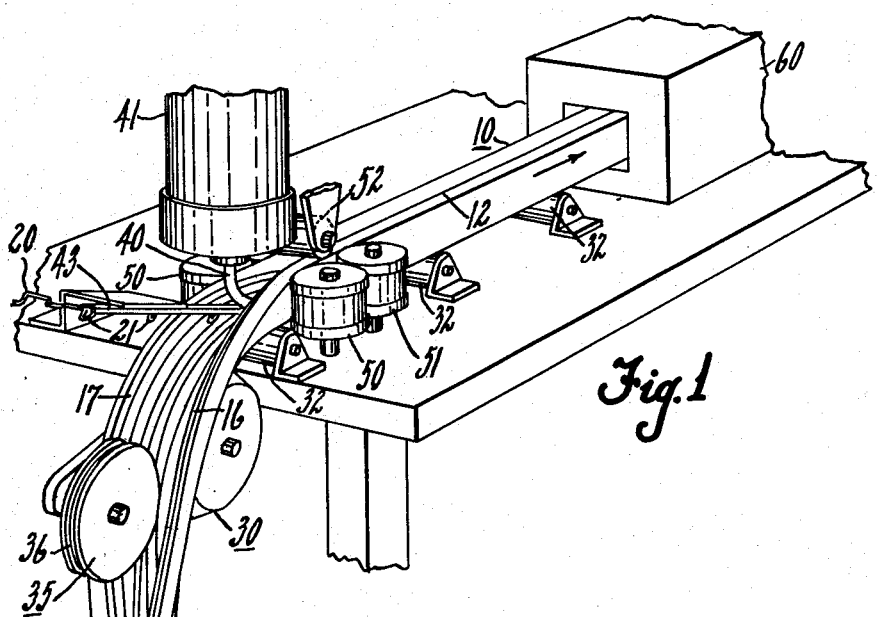
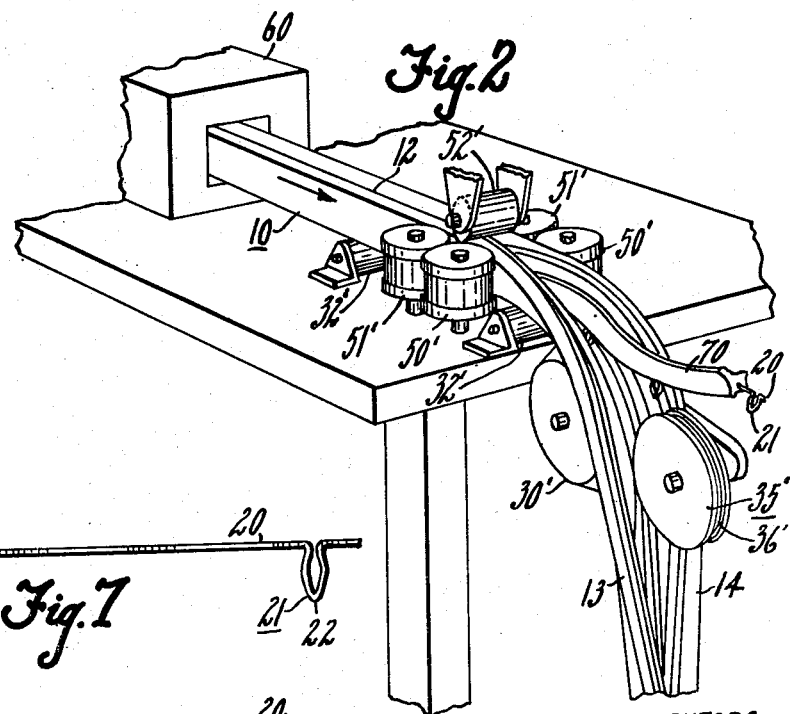
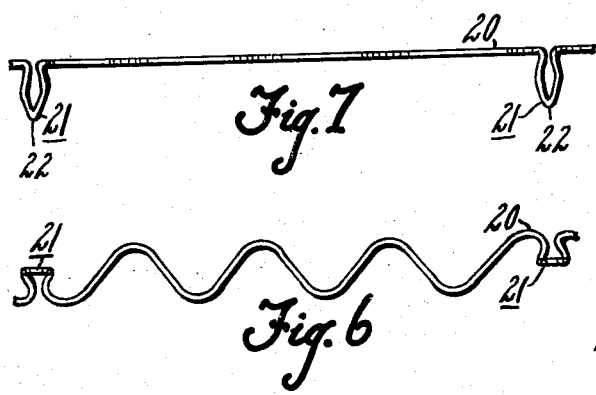
INVENTORS
EDWARD P. HARRIS
FREDRICK W. SAMPSON
BY Willits Hardman & Fehr
THEIR ATTORNEYS

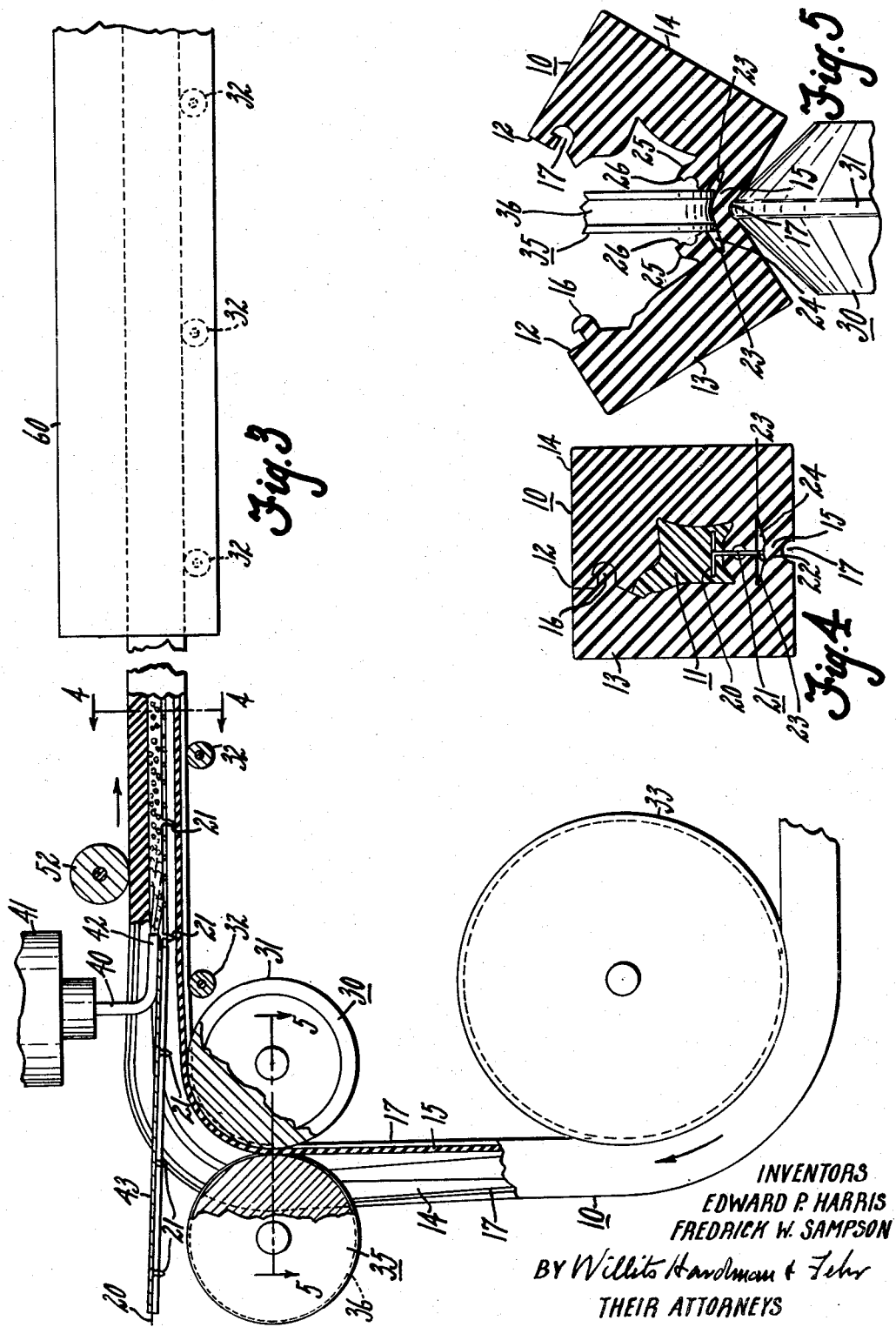

Patented Feb. 16, 1954

2,668,987

UNITED STATES PATENT OFFICE 2,668,987

MOLD FOR AND METHOD OF MOLDING FOAM RUBBER STRIPS AND THE LIKE

Edward P. Harris and Frederick W. Sampson, Dayton, Ohio, assignors to General Motors Corporation, Detroit, Mich., a corporation of Delaware Application October 21, 1950, Serial No. 191,444

11 Claims. (Cl. 18—36)

This invention relates to a mold for and a continuous method of making an elongated strip of moldable materials, especially from foamed latex or other materials which are in a fluid foamy condition at the time of filling the mold cavities therewith.

Ordinarily when injecting foamed latex or similar fluid foamy molding materials into an elongated mold cavity having a relatively narrow cross section, it has been found difficult to fill the relatively long cavity with a desired low but uniform pressure in the material from end to end of the cavity. This is due to the fact that when a foamed latex compound is forced at relatively low pressures thru a narrow section or relatively restricted cavity to form an elongated molded strip, of say, 10 feet in length, the internal pressure in the filled material will vary considerably from a maximum at the point in the mold cavity adjacent the injection nozzle to a minimum at the point in the cavity of furthest flow-off the material. Variation in internal pressures in the material along the length of the cavity will of course cause a similar variation in the size of the air or gas bubbles in the foamy material therein and a corresponding variation in density along the length of the finally cured spongy strip when taken from the mold.

Now one object of this invention is to overcome the above stated difficulties by providing a method of filling such elongated mold cavities with a fluid foamy moldable material at a low but highly uniform internal pressure thruout the length of the cavity. Specifically, the method of this invention ejects the foamy material from a nozzle into the mold cavity at a substantially constant desired low pressure while simultaneously relatively moving said nozzle along the length of the mold cavity. Thus an even distribution of the foamy material thruout the cavity length can be readily obtained at any desired low internal pressure in the material.

Another object is to provide a continuous method of molding strips wherein an endless flexible mold of flexible rubber-like material continuously moves past the relatively stationary filling nozzle and is simultaneously progressively filled with the foamy material flowing from said nozzle directly into the mold cavity. The endless mold has a continuous longitudinal split leading into its mold cavity and the relatively stationary filling nozzle extends thru said split directly into the mold cavity while the material conduit leading to said nozzle passes along thru the opened split while the mold moves relative thereto.

Another object is to provide such a split flexible mold having means for retaining in place within the mold cavity a continuous reinforcing insert which passes thru the split in the mold and into the mold cavity adjacent the filling nozzle.

Another object is to provide such a split flexible mold having mutually interlocking yieldable portions on the two opposed edges of the dividing split therein, which portions interlock by being forced together to normally retain said mold closed along said split.

Further objects and advantages of the present invention will be apparent from the following description, reference being had to the accompanying drawings wherein a preferred embodiment of the present invention is clearly shown.

In the drawings:

Fig. 1 is a perspective view of part of the apparatus of this invention, and shows how the endless split flexible mold is progressively flexed open along its length to permit the filling nozzle and reinforcing wire to pass into the mold cavity while the mold continues to travel.

Fig. 2 is a perspective view of another portion of the apparatus of Fig. 1, and shows how the endless flexible mold is progressively flexed open along its length to permit the cured molded strip to pass out of the mold cavity while the mold continues to travel.

Fig. 3 shows, in part, a longitudinal section thru the portion of the flexible mold shown in Fig. 1, and illustrates how the reinforcing wire and the foamy molding material continuously enters the mold cavity in the moving flexible mold.

Fig. 4 is a transverse section taken on line 4—4 of Fig. 3, and shows the mold fully closed immediately after it is progressively filled with the molding material.

Fig. 5 is taken on line 5—5 of Fig. 3, and shows how the moving flexible mold is progressively flexed open as it passes around the rollers used for this purpose.

Figs. 6 and 7 are detail views of the reinforcing wire insert embedded in the molded strip. Fig. 6 is a plan view and Fig. 7 an edge view of said wire insert.

Similar reference characters refer to similar parts thruout the several views.

The relatively long endless flexible mold 10 is made of flexible rubber or other suitable rubber-like material and has a mold cavity 11 of the desired cross section extending continuously thruout its length. The specific form illustrated in the drawings will now be described. Cavity 11 has a cross section designed to mold a sponge rubber automobile door-sealing strip of the type disclosed in Ser. No. 164,738, filed May 27, 1950, by Edward P. Harris, now Patent No. 2,579,072, owned by the assignee of this present application. The cross section of flexible mold 10 is shown locked in closed position in Fig. 4 and in laterally-flexed-open position in Fig. 5. Mold 10 has therein a continuous longitudinal split 12 extending inwardly to the mold cavity 11, which thus substantially divides the mold section into two opposed relatively movable portions or "halves" 13 and 14 which are sufficiently thick and rigid to be substantially bodily spread apart by distorting the relatively thin and flexible hinge portion 15 of mold 10. The mold half 13 is shown as having a continuous interlocking projection 16, located at the dividing split 12 which can be forced into a correspondingly shaped recess 17 in mold half 14 due to a slight yieldability of these parts, and thereby retain the two mold halves 13 and 14 substantially locked in closed position as shown in Fig. 4. However this interlocking of parts 16 and 17 should not be so strong as to prevent mold halves 13 and 14 from being progressively pulled apart at the dividing split 12 when said halves 13 and 14 are spread apart (by hinging about hinge portion 15) by the mechanism shown in Figs. 2 and 5, or by other suitable mold-spreading mechanism.

The continuous wire reinforcing member 20 (see Fig. 6) is held clamped in proper position in the mold cavity 11 as follows. At the lower portion of mold cavity 11 the two mold halves 13 and 14 have two mutually opposed continuous projections 25 whose opposed end surfaces 26 are slightly yieldable and preferably are in pressure contact when the mold halves 13 and 14 are fully closed (see Fig. 4), but are spread apart when mold halves 13 and 14 are spread apart (as shown in Fig. 5). These continuous projections 25 when spread apart permit the series of longitudinally spaced spring tongues 21 on reinforcing wire 20 to pass therebetween, as later described herein, and then as the mold halves 13 and 14 close together the series of spring tongues 21 are clamped firmly between the slightly yieldable opposed end surfaces 26 of projections 25 as shown in Fig. 4. The lower tips 22 of spring tongues 21 contact the top surface of the hinge portion 15 and thus the main zig-zag portion of reinforcing wire 20 is properly vertically located above the bottom surface of the mold cavity 11 so as to be later embedded in the material molded in said cavity. The continuous longitudinal void 24 in mold 10 does not form part of the mold cavity 11 since the continuous projections 25 press directly against each other between the longitudinally spaced spring tongues 21 when the mold is closed (see Fig. 4).

Mold 10 has a continuous central groove 17 on its outer surface within which the tread 31 on the tapered periphery of the exterior guide roller 30 rides as the travelling mold 10 bends around roller 30 and is progressively spread open (see Figs. 3 and 5). The inner spreading roller 35 has a concave peripheral tread 36 (best shown in Fig. 5) which rides upon the upper surface of the flexible hinge portion 15 directly opposed to and aligned with the rounded tread 31 of roller 30. Thus as the travelling mold 10 passes between rollers 30 and 35 the flexible hinge portion 15 is squeezed between treads 31 and 36 and distorted thereby so as to maintain mold halves 13 and 14 spread apart as shown in Figs. 1 and 5 over a substantial length of the travelling mold 10. The longitudinal void 24 in mold 10 (see Fig. 4) is formed by two lateral slots 23 (see Fig. 5). Slots 23 define the length and thickness of the flexible hinge portion 15 of the mold and hence are so shaped as to provide the desired flexibility at hinge portion 15. It will be seen from Fig. 5 that these slots 23 also enable the wire-clamping projections 25 to move out of the way so as to permit the inner roller 35 to pass therebetween when the mold halves 13 and 14 are spread apart. Of course as mold 10 moves continuously past the spreading rollers 30 and 35 and the distorting pressure on hinge portion 15 is thereby relieved mold halves 13 and 14 tend to progressively return toward their closed position as mold 10 travels forward.

Now referring to Fig. 3, as mold 10 travels continuously in the direction of the arrows thru the spreading rollers 30 and 35 and bends around roller 30 as shown, the mold halves 13 and 14 remain spread apart for a short distance beyond the spreading rollers and the bend in the mold. This open distance is utilized to properly pass both the reinforcing wire 20 and the conduit 40 for the molding material directly into the mold cavity 11. Conduit 40 leads from a supply 41 containing the flowable molding material laterally between the open edges of the continuous dividing split 12 of mold 10 to the outlet nozzle 42. When it is desired to fill cavity 11 with a minimum internal pressure within the filled cavity, the stationary outlet nozzle 42 delivers the molding material freely at substantially atmospheric pressure at the central portion of the cross section of mold cavity 11 and in the direction of travel of mold 10. Outlet nozzle 42 preferably extends longitudinally a sufficient distance within cavity 11 as to deliver the molding material into cavity 11 at a point where the mold halves 13 and 14 have come together, or nearly so, in order to minimize escape of the molding material thru the dividing split 12 at the point of delivery. A stationary guide chute 43 for guiding the travelling reinforcing wire 20 is fixed in place at its delivery end to the under side of nozzle 42 so as to deliver the wire properly centered into mold cavity 11 with its longitudinal spaced depending spring tongues 21 thereon so guided in vertical position as to pass accurately between the clamping projections 25 on mold 10 and be successively clamped thereby as said clamping projections 25 are pressed together upon the full closing of mold halves 13 and 14. The endless mold 10 is driven continuously at a uniform speed by any suitable driving means and is guided by any suitable guides spaced along its length, such as the small guide rollers 32 on straight stretches thereof, and by relatively large guide sheaves to more gradually carry the mold 10 around curves, such as the relatively large guide sheave 33 shown in Fig. 3.

The mold halves 13 and 14 are guided and gradually forced into fully closed position first by the two opposed lateral rollers 50 and finally by the two opposed lateral rollers 51 which press mold halves 13 and 14 together with such force as to cause the interlocking portions 16 and 17 to nest and interlock together by a slight distortion thereof. The top roller 52 holds mold 10 bent down into its horizontal stretch after it passes thru spreader rollers 30 and 35, and of course also aids in closing mold halves 13 and 14. The interlocking portions 16 and 17 may be made to interlock with sufficient strength to withstand any internal pressure in mold cavity 11 during the curing of foamed latex compounds, or other thermosetting compounds which can be set at quite low internal pressures. However wherever desired mold 10 may be very positively held closed by suitably spaced exterior rollers rolling thereupon in the manner of rollers 50, 51, and 52. Such retaining rollers may be used in addition to the interlocking portions 16 and 17, or may be entirely substituted therefor.

After mold 10 is filled with the molding material and fully closed as illustrated in Figs. 1 and 4, it passes thru an elongated curing chamber 60 heated to the desired temperature to progressively and continuously cure the material for the desired period of time, which time period is determined by the rate of travel of mold 10 and the effective length of the curing chamber 60.

After curing to the desired extent mold 10 emerges from curing chamber 60, and the mold halves 13 and 14 are again spread open at the dividing split 12 as illustrated in Fig. 2, in order to permit the cured strip 70 to pass continuously from the mold while it continues to travel at its normal speed. Mold 10 is positively guided adjacent the exit of strip 70 by rollers 32', 50', 51', and 52', all of which rollers are similarly arranged to the similarly numbered rollers shown in Fig. 1, as clearly shown in Fig. 2. As mold 10 passes from these guide rollers 32', 50', 51' and 52' it is curved downwardly between spreader rollers 30', and 35' which function similarly to spreader rollers 30 and 35 respectively as described above, and spread the mold halves 13 and 14 wide apart and permit the cured strip 70 to pass from mold 10 at the speed of travel of mold 10. When mold halves 13 and 14 are thus spread apart the wire-clamping projections 25 separate from each other and so release their grip upon the wire tongues 21 in proper time for the cured strip 70 to pass from the mold. Strip 70 may be led away from the exit end of mold 10 by any suitable guiding means (not shown), such as a roller or belt conveyor or the like.

The apparatus and method described above is particularly suitable for making sponge rubber strips from foamed latex compounds. Such foamed latex compounds when in an ungelled condition are very flowable and can be readily injected thru filling nozzle 42 at a constant rate of flow to progressively fill mold cavity 11 at a highly uniform low pressure, to give an internal pressure within the filled mold cavity only slightly above atmospheric pressure. The internal pressure within the mold cavity need be no higher than that required to insure the complete filling of mold cavity 11, for example from 4 oz. to 8 oz. per square inch dependent on the viscosity of the foamed latex compound. However if greater density is desired in the final cured sponge rubber strip the mold cavity 11 may be filled at such higher internal pressure as will compress the foamy compound before it gels and give a molded product having the desired final density after curing. In all cases the final cured strip will have substantially the same density from end to end thereof due to the uniform internal pressure in the molding material thruout the length of mold cavity, which uniformity in turn is due to the fact that the injected material does not flow lengthwise thru the elongated mold cavity to any material extent.

The ungelled readily flowable foamed latex compound as it flows from nozzle 42 will readily flow around and fully embed all portions of the reinforcing wire 20 which extend within mold cavity 11. The molding material is so compounded that gelling occurs progressively after the travelling mold 10 is fully closed at the point of gelling. This insures accurate conformation of the cross section of the molded strip to that of the mold cavity since it eliminates distortion of any section of the strip after gelling thereof. A typical example of curing conditions for such a foamed latex strip is to subject each portion of the strip to a temperature of 212° F. for a period of twenty minutes. The internal pressure in the material while curing is very little, if any, above atmospheric and hence can be readily confined by the above described flexible rubber mold 10 without materially distorting the cross section of mold cavity 11.

While the embodiments of the present invention constitute a preferred form, it is to be understood that other forms might be adopted.

What is claimed is as follows:

1. In a method for molding elongate strips from flowable foamy material, the steps comprising; providing an elongate mold having a longitudinally extending slit therein which connects with an elongate mold cavity having the desired cross section of the strip to be formed therein, progressively hinging said mold open at said slit for opening a portion only of the cavity, progressively inserting flowable foamy compound into said cavity at said open portion, progressively closing the mold cavity at said slit and, permitting the flowable foamy material to cure and assume the cross sectional shape of the mold cavity, progressively removing the cured strip by progressively laterally spreading apart the mold portions at the split therein to permit the cured strip to pass out of the mold cavity, and progressively permitting the mold to close and resume its inherent closed reusable form.

2. In a method of molding elongate strips from flowable foamy compound the steps comprising; providing a mold made from elastomeric material and including an elongate normally closed cavity having the desired cross section of the strip to be formed therein connected to the outside of the mold by an elongate slit, progressively hingedly opening a portion of said mold at said slit to expose the cavity therein, supplying flowable foamy material to said cavity at said open portion, progressively closing the mold cavity and, permitting the flowable foamy material to cure and assume the cross sectional shape of the mold cavity, progressively removing the cured strip by progressively laterally spreading apart the mold portions at the split therein to permit the cured strip to pass out of the mold cavity, and progressively permitting the mold to close and resume its inherent closed reusable form.

3. In a method of molding elongated strips from a foamy compound, the steps comprising: providing an elongated unitary normally closed mold having a continuous longitudinal split leading into the elongated cavity therein, progressively splitting a portion only of the mold to an open position, filling said elongated mold cavity progressively with the flowable foamy compound by continuously flowing said compound into said cavity through a filling nozzle inserted directly into said cavity at said split portion while moving said mold lengthwise relative to said nozzle, progressively closing the mold for forming the foamy compound to the desired shape, progressively curing said compound in said mold, progressively splitting a portion only of the mold, removing the formed strip continuously through the opening formed by the split portion, and then progressively permitting the mold to close and resume its inherent closed reusable form.

4. In a method of molding an elongate article from a flowable foamy compound, the steps comprising: providing a continuous flexible mold having a continuous normally closed split leading into a mold cavity which extends substantially from end to end thereof, progressively opening a portion only of said mold cavity at said split, filling said cavity progressively lengthwise by continuously flowing the flowable foamy compound directly therein through a filling nozzle into said split portion while the mold and nozzle are moving relative to one another, progressively closing the split portion thereby closing the mold cavity for forming the article, maintaining closed the filled length of elongated mold while the compound therein sets and is cured to the desired degree and forms a unitary molded article which will retain its molded cross section shape upon being removed from the mold, progressively removing the molded article by progressively laterally spreading apart the mold at the split to permit the molded article to pass continuously out of the mold cavity, and progressively permitting the mold to close and resume its inherent closed reusable form.

5. In a method of molding elongated strips from a fluid foamy compound, the steps comprising: providing an endless travelling unitary flexible mold of rubber-like material having a continuous longitudinal split connected with a longitudinally extending mold cavity therein, progressively bending the unitary flexible mold around a curve in its path of travel and laterally spreading apart the mold at said split while the mold passes around said curve to provide access to the mold cavity, flowing a flowable foamy compound into the mold cavity through said point of access to progressively and uniformly fill the cavity, progressively closing the mold immediately after the cavity is filled by flexing its laterally spread portions together at said split to form the strip, maintaining the filled length of the travelling mold closed while the compound therein is cured therein to the desired degree, progressively removing the cured strip lengthwise from the mold by progressively laterally spreading apart the mold at the split to permit the cured strip to pass out of the mold cavity, and then permitting the mold to close and resume its closed reusable form.

6. The method as claimed in claim 5 including the added step of; progressively inserting a reenforcing element into said cavity substantially simultaneously with the flowing in of the foamy compound.

7. An endless mold of flexible rubber-like material for molding a continuous elongated strip from flowable foamy material comprising; a continuous flexible unitary normally closed mold of indeterminate length having a unitary continuous internal cavity of predetermined shape therein, a continuous longitudinal split being located so as to expose a portion of the internal cavity when the flexible mold is laterally flexed, mutually interlocking yieldable portions on the opposed edges of the split adapted to normally retain the edges of the split in substantially closed relation, mutually engaging surface portions within the cavity adapted to retain reinforcing elements for said strip, and means within said mold whereby the mold can be laterally flexed over a portion of its length so as to expose a portion of the internal cavity.

8. In a method of molding elongated strips from a flowable fluid compound which is capable of setting to a nonflowable condition, the steps comprising; providing a moving endless unitary flexible mold of rubber-like material having a continuous longitudinal split extending into a normally closed longitudinally extending mold cavity having a predetermined cross-section shape therein, progressively flexing a portion of said moving mold for causing said longitudinal split to open for exposing a portion of said mold cavity, flowing fluid unset compound into said mold cavity through an opened longitudinal split for progressively filling a moving length of said mold cavity, progressively closing said mold cavity by flexure of said mold, maintaining closed said length of moving mold cavity until the flowable unset fluid compound sets and forms a unitary strip having the cross-sectional shape of the mold cavity, and finally progressively removing said strip lengthwise from the mold cavity while said mold is progressively flexed and opened at a longitudinal split to permit said strip to pass lengthwise out of the mold cavity while said mold continues to move.

9. In a method of molding elongated strips from a flowable ungelled foamy compound which is capable of gelling, the steps comprising; providing a moving endless unitary flexible mold of rubber-like material having a continuous longitudinal split extending into a normally closed longitudinally extending mold cavity having a predetermined cross-sectional shape therein, progressively flexing a portion of said moving mold for causing said longitudinal split to open for exposing a portion of said mold cavity, flowing a flowable foamy ungelled compound into said mold cavity through an open longitudinal split for progressively filling a moving length of said mold cavity and substantially, simultaneously progressively inserting a reinforcing element into said cavity with the flowing in of the foamy compound, progressively closing said mold cavity by flexure of said mold, maintaining closed said length of moving mold cavity until the flowable foamy ungelled compound gels and forms a unitary reinforced strip having a cross-sectional shape of the mold cavity and finally progressively removing said reinforced strip lengthwise from the mold cavity while said mold is progressively flexed and opened at a longitudinal split to permit said strip to pass lengthwise out of the mold cavity while said mold continues to move.

10. In a method of molding elongated strips from a flowable ungelled foamy compound which is capable of gelling the steps comprising; moving an endless unitary flexible mold of rubber-like material having a continuous longitudinal split extending into a normally closed longitudinally extending mold cavity having a predetermined cross-sectional shape therein and having mutually interlocking yieldable portions on opposed edges of the split adapted to retain the edges thereof in a substantially closed relation, and mutually engaging surface portions within the cavity adapted to clamp and position reinforcing elements within said cavity, progressively flexing a portion of said moving mold for causing said mutually interlocking portions to be disengaged whereby said longitudinal split is opened for exposing a portion of said mold cavity, flowing a flowable ungelled foamy rubber-like compound into said mold cavity through said opened longitudinal split for progressively filling a moving length of said cavity and simultaneously progressively inserting a reinforcing element between the clamping elements of said mold cavity for positioning said reinforcing element relative to the ungelled flowable compound, progressively closing said mold cavity by flexure of said mold whereby said interlocking means are engaged and said reinforcing element is clamped and positioned relative to the mold cavity by said clamping means, maintaining closed said length of moving mold cavity until the flowing foamy ungelled compound gels and forms a unitary reinforced strip having the cross sectional strip of the mold cavity, and finally progressively flexing said mold for releasing said interlocking elements for opening said longitudinal split and unclamping said reinforcing elements while substantially simultaneously lengthwise removing said reinforced strip from said mold cavity through the split while said mold continues to move.

11. In a method of molding longitudinal strips from a flowable ungelled foamy compound which is capable of gelling the steps comprising, moving an endless unitary flexible mold of rubber-like material having a continuous longitudinal split having yieldable interlocking portions on opposed edges thereof and extending into a normally closed longitudinally extending mold cavity of predetermined cross-sectional shape, progressively flexing portions of said moving mold for disengaging said interlocking yieldable portions for opening said longitudinal split whereby a portion of said mold cavity is exposed, flowing a flowable ungelled foamy compound into said mold cavity through said open longitudinal split for progressively filling a moving length of said mold cavity, progressively closing said mold cavity by flexure of said mold and interlocking of said yieldable portions, maintaining closed said length of moving mold cavity until the flowable foamy ungelled compound gels and forms a unitary strip having the cross-sectional shape of the mold cavity and finally progressively removing said strip lengthwise from the mold cavity while said mold is progressively flexed and the interlocking elements are disengaged for opening said longitudinal split to permit said strip to pass therethrough and pass lengthwise out of the mold cavity while said mold continues to move.

EDWARD P. HARRIS.
FREDERICK W. SAMPSON.

References Cited in the file of this patent

UNITED STATES PATENTS

| Number | Name | Date |
|---|---|---|
| 775,540 | McConnell | Nov. 22, 1904 |
| 1,399,485 | Johnson | Dec. 6, 1921 |
| 1,949,226 | Wallace | Feb. 27, 1934 |
| 2,141,405 | Randall | Dec. 27, 1938 |
| 2,329,239 | Banigan | Sept. 14, 1943 |
| 2,395,920 | Te Grotenhuis | Mar. 5, 1946 |
| 2,538,406 | Allen | Jan. 16, 1951 |